(12) United States Patent
Dimou et al.

(10) Patent No.: US 9,232,405 B2
(45) Date of Patent: Jan. 5, 2016

(54) METHOD AND APPARATUS FOR INTER-CELL INTERFERENCE COORDINATION IN A WIRELESS COMMUNICATION NETWORK

(75) Inventors: Konstantinos Dimou, Stockholm (SE); Bengt Lindoff, Bjärred (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 512 days.

(21) Appl. No.: 13/561,838

(22) Filed: Jul. 30, 2012

(65) Prior Publication Data
US 2014/0029524 A1    Jan. 30, 2014

(51) Int. Cl.
*H04W 72/08*    (2009.01)
*H04W 16/10*    (2009.01)
*H04W 24/02*    (2009.01)
*H04W 16/18*    (2009.01)

(52) U.S. Cl.
CPC .............. *H04W 16/10* (2013.01); *H04W 16/18* (2013.01); *H04W 24/02* (2013.01)

(58) Field of Classification Search
CPC ....... H04W 4/00; H04W 16/14; H04W 16/18; H04W 24/00; H04W 24/08; H04W 28/04; H04W 36/18; H04W 36/30; H04W 48/16; H04W 48/20; H04W 72/04; H04W 72/08; H04B 1/00; H04B 1/027; H04B 15/00; H04B 17/00; H04L 5/0007
See application file for complete search history.

(56) References Cited

U.S. PATENT DOCUMENTS

| 8,194,584 | B2 | | 6/2012 | Nakatsugawa | |
| 8,200,263 | B2 | * | 6/2012 | Wei et al. | 455/501 |
| 8,422,461 | B2 | * | 4/2013 | Dickey | 370/332 |
| 8,493,919 | B2 | * | 7/2013 | Leung | 370/329 |
| 8,934,896 | B2 | * | 1/2015 | Zhu | 455/434 |
| 2007/0280147 | A1 | | 12/2007 | Catreux-Erceg et al. | |

(Continued)

FOREIGN PATENT DOCUMENTS

| EP | 2063678 | 5/2009 |
| WO | 2010105231 | 9/2010 |
| WO | 2011/029469 A1 | 3/2011 |

OTHER PUBLICATIONS

Application No. 61/439455 Title: A Method and Apparatus for Reducing Intercell Interference Filing Date: Feb. 4, 2011 Author: Dimou, Konstantinos.*

(Continued)

*Primary Examiner* — Andrew Lai
*Assistant Examiner* — Leon Andrews
(74) *Attorney, Agent, or Firm* — Murphy, Bilak & Homiller, PLLC

(57) ABSTRACT

One aspect of the teachings herein involves the advantageous use of learned statistical information to improve inter-cell interference coordination (ICIC). The network uses historical signal quality measurements collected over time for wireless communication devices operating within its coverage areas to identify those geographical areas where devices generally experience significant levels of patterned interference. In an example case, the network develops a "map" of the geographical areas that are affected by the transmission patterns of neighboring nodes, and it applies the map to ICIC operations, wherein the serving nodes associated with the affected areas incorporate knowledge of the interfering transmission patterns into the ongoing scheduling of users operating in the affected areas.

24 Claims, 4 Drawing Sheets

(56) References Cited

U.S. PATENT DOCUMENTS

| | | | |
|---|---|---|---|
| 2008/0070510 | A1 | 3/2008 | Doppler et al. |
| 2009/0305741 | A1 | 12/2009 | Takeuchi et al. |
| 2009/0316591 | A1 | 12/2009 | Reial et al. |
| 2010/0150007 | A1 | 6/2010 | Jung et al. |
| 2012/0021753 | A1 | 1/2012 | Damnjanovic et al. |
| 2012/0134275 | A1 | 5/2012 | Choi et al. |
| 2012/0140690 | A1 | 6/2012 | Choi et al. |
| 2012/0178482 | A1 | 7/2012 | Seo et al. |
| 2012/0202554 | A1 | 8/2012 | Seo et al. |
| 2012/0213189 | A1 | 8/2012 | Choi et al. |
| 2013/0114562 | A1 | 5/2013 | Seo et al. |

OTHER PUBLICATIONS

Fodor, Gabor, "Intercell Interference Coordination in OFDMA Networks and in the 3GPP Long Term Evolution System," Journal of Communications, vol. 4, No. 7, Aug. 2009, Academy Publisher.

Dimou, Konstantinos, "Method and Apparatus for Reducing Intercell Interference," Pending U.S. Appl. No. 13/327,486, filed Dec. 15, 2011.

Author Unknown. 3GPP TR 36.921, 1.0.0 (Dec. 2009). 3rd Generation Partnership Project; Technical Specification Group Radio Access Networks; Evolved Universal Terrestrial Radio Access (E-UTRA); FDD Home eNodeB (HeNB) Radio Frequency (RF) requirements anaylsis (Release 9). Dec. 2009.

Bergstrom, M. "Analysis of Interference and Performance in Heterogeneously Deployed LTE Systems." Master of Science Thesis, KTH School of Information and Communications Technology, Department of Communication Systems, Stockholm, Sweden, Sep. 2010.

Landstrom, S. et al. "Deployment Aspects of LTE Pico Nodes." IEEE International Conference on Communications Workshops, Jun. 5-9, 2011.

Liang, Y. et al. "Evolution of Base Stations in Cellular Networks: Denser Deployment versus Coordination" IEEE International Conference on Communications, May 19-23, 2008.

Unknown. Author, "Carrier Aggregation in Heterogeneous Networks", 3GPP TSG RAN WG1 #57bis, R1-092705, Los Angeles, CA. USA, Jun. 29-Jul. 3, 2009.

* cited by examiner

METHOD AND APPARATUS FOR INTER-CELL INTERFERENCE COORDINATION IN A WIRELESS COMMUNICATION NETWORK

TECHNICAL FIELD

The present invention generally relates to wireless communication networks and particularly relates to inter-cell interference coordination (ICIC) in such networks.

BACKGROUND

"Heterogeneous" cellular networks use a mix of low-power and high-power nodes, with the low-power nodes providing smaller, localized areas of improved coverage and higher data rate service within the larger coverage areas of the high-power nodes. Such arrangements allow network operators to improve coverage and address the constantly increasing demand by users for higher data rate service, without having to incur the expense and impracticality of simply increasing the number of high-power nodes.

The coverage areas of the high-power nodes are referred to herein as "macro" cells, while the coverage areas of the low-power nodes are referred to herein as "pico" cells. These are relative terms and denote only that the pico cells generally are smaller than the macro cells. In extending this nomenclature, the high-power nodes are referred to as macro nodes and the low-power nodes are referred to as pico nodes. As such, the macro layer in a heterogeneous network comprises the macro nodes and their corresponding macro cells, while the pico layer in a heterogeneous network comprises the pico nodes and their corresponding pico cells.

Various operating schemes are known for heterogeneous networks. For example, the pico cell(s) overlaid by a given macro cell may share the same cell ID, such that the involved macro and pico node(s) operate as different transmission points within the same shared cell. In other schemes, the macro and pico nodes have unique cell IDs but may operate in cooperative fashion. For example, macro and/or pico nodes may operate in a Time Division Mode (TDM), in which they mute their transmissions according to a predetermined schedule, or "muting" pattern. This pattern of muted time periods makes it possible for communication devices and other nodes in the network to predict those time periods during which such a node will mute its transmissions and those during which it may potentially schedule transmissions. For purposes of this description, interference caused by a node that mutes its transmissions according to a particular schedule is referred to as "patterned interference."

In one example of muting, a macro node mutes its downlink transmissions during certain times, e.g., Transmission Time Intervals or TTIs, so as not to interfere with users connected to pico nodes in or around the macro cell of the macro node. The TDM transmission pattern used for such muting comprise a predetermined allocation of timer periods that defines when the relevant macro node will refrain from scheduling transmissions to and/or from wireless communication devices served by the macro node.

Muting by a potentially interfering macro node is especially helpful for users operating in the "extended" range of a pico cell, e.g., where the coverage area of a pico node is expanded through use of a cell selection offset that improves the apparent signal quality of the pico node. However, muting is also important for pico nodes. Consider a "Home eNB" as an example pico node. Commonly, Home eNBs restrict node access using a Closed Subscriber Group (CSG) list that identifies a typically small number of wireless communication devices that are authorized to access the network through the Home eNB.

Consequently, a given wireless communication device may be operating quite close to the Home eNB and yet be unable to use it for network access. Instead, such a user would be connected to the network through the macro node. However, downlink (DL) transmissions by the serving macro node to that user may be significantly interfered with by DL transmissions by the Home eNB to its authorized users. Thus, by applying a TDM muting pattern to its DL transmissions, the Home eNB avoids interfering with nearby users connected to a macro node.

Relays represent another type of low-power node. In a known arrangement, a relay node extends or improves service within the macro cell of a macro node, which is referred to as a "donor" macro node, to indicate its support of the relay node. In an example using nomenclature from the Long Term Evolution (LTE) standard, a relay node is supported by a donor eNB, where LTE eNBs represent one type of macro node. In such contexts, a relay node uses muting times to listen to transmissions by its donor eNB.

While the use of TDM muting patterns in heterogeneous networks provides potentially significant reductions in interference for certain scheduled transmissions, it also results in potentially dramatic variations in the interference level seen by users. For example, a relay node that is close to a macro cell border generates interference with high variance to users operating in the neighbor cell(s).

Of course, a Home eNB or other pico node using muting would create similarly varying patterns of interference with respect to proximate users supported by other nodes. Further, users connected to macro nodes but operating macro cell edges may experience highly varying levels of other-cell interference arising from the patterned transmissions of neighboring macro nodes.

To avoid some of these problems, it is known, for example, for a donor eNB to provide neighboring eNBs with muting pattern information for the relay node(s) operating within the cell(s) of the donor eNB. The neighboring eNBs would use such information to avoid scheduling their cell-edge users at times when the identified relay nodes transmit or receive. However, such operation requires the sharing of such information between eNBs, adding to sidehaul signaling overhead. Further, not all cell-edge users in the neighboring macro cells are affected by the relay node(s) in question, and it is inefficient to restrict scheduling for such users in dependence on the transmit/receive times of such relay nodes.

It is also known to perform a "live," dynamic detection of interference variance, and to incorporate the interference pattern(s) detected for a given user into ongoing scheduling decisions. For example, a wireless communication device may dynamically track the interference level it experiences, and it or the network uses such tracking to blindly detect that the device is experiencing patterned interference. In turn, the network may incorporate knowledge of the blindly detected interference pattern into the scheduling decisions made for that device, so as to avoid scheduling the device at times of high interference levels. Of course, such operation can impose significant processing and signaling burdens on individual devices and on the network at large.

SUMMARY

One aspect of the teachings herein involves the advantageous use of learned statistical information to improve inter-cell interference coordination (ICIC). The network uses historical signal quality measurements collected over time for wireless communication devices operating within its coverage areas to identify those geographical areas where devices generally experience significant levels of patterned interference. In an example case, the network develops a "map" of the geographical areas that are affected by the transmission patterns of neighboring nodes, and it applies the map to ICIC operations, wherein the serving nodes associated with the affected areas incorporate knowledge of the interfering transmission patterns into the ongoing scheduling of users operating in the affected areas.

In one embodiment, a method of ICIC control in a wireless communication network includes identifying an interference zone within a coverage area of the network where wireless communication devices are subject to patterned interference arising from interfering TDM transmissions in or around the coverage area. Identification of the interference zone according to the method is based on signal measurement reports and corresponding positioning data obtained for given wireless communication devices during operation within the coverage area.

The method further includes recording location data defining the interference zone in an interference map, and providing the interference map for use in adapting ICIC operations with respect to a wireless communication device operated in the coverage area, based on the location of the wireless communication device relative to the interference zone. For example, ongoing scheduling of the device is adapted to wholly or partly avoid times of high interference associated with the TDM transmission pattern(s) known to affect the interference zone, in response to detecting that the device is in or approaching the interference zone.

Advantageously, the method does not require ongoing, live detection of interference patterns and the areas affected by them. Rather, such information may be developed during a learning period and then used on a forward-going basis, thus obviating the requirement for the network to continue detecting in which of its coverage areas wireless communication devices generally are substantially affected by patterned interference. Of course, it is also contemplated that such operations be done on a continuing or recurring basis, to adapt an initial mapping to changing network conditions, such as where new network nodes are deployed.

In another embodiment, a network node is configured for use in a wireless communication network that provides communication service to wireless communication devices. The network node includes one or more processing circuits that are configured to identify an interference zone within a coverage area of the network where wireless communication devices are subject to patterned interference arising from interfering TDM transmission in or around the coverage area. The identification is based on signal measurement reports and corresponding positioning data obtained for given wireless communication devices during their operation within the coverage area.

The processing circuits of the node are further configured to record location data defining the interference zone in an interference map, and provide the interference map for use in adapting ICIC operations with respect to a wireless communication device operated in the coverage area, based on the location of the wireless communication device relative to the interference zone. For example, if the node that determines the map is the same node responsible for user scheduling within the geographic region represented by the interference zone, "providing" the interference map means, for example, making it available to the processing unit performing such scheduling. In the case where the node that determines the map is not the same node that performs user scheduling within the geographic region represented by the interference zone, "providing" the interference map means, for example, signaling all or a relevant portion of the interference map to the node that handles such scheduling.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
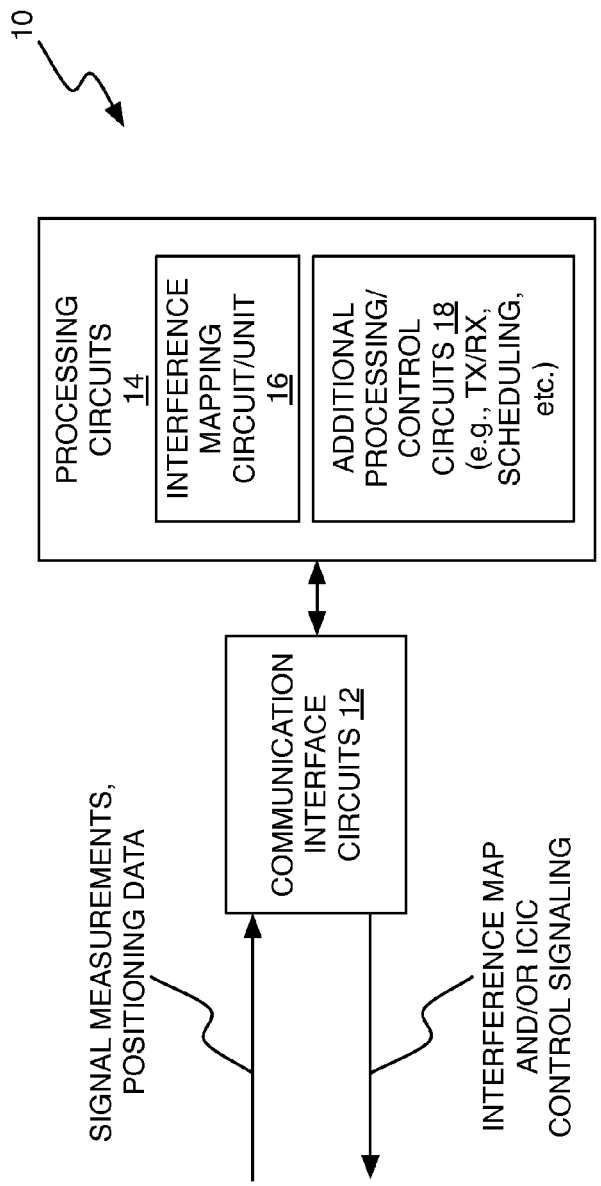
FIG. 1 is a block diagram of one embodiment of a network node for use in a wireless communication network, where the node is configured to perform interference mapping.

FIG. 1 illustrates one embodiment of a network node 10 that includes one or more communication interface circuits 12, and one or more processing circuits 14 that at least functionally include an interference mapping circuit 16 and one or more additional processing circuits 18. The nature and extent of the one or more additional processing circuits 18 depends on the type of node 10. In one embodiment, the node 10 is a base station or other radio transceiver node, and it thus may include radiofrequency transceiver circuitry (receivers and transmitters) and user scheduling circuitry, etc. In other embodiments, the node 10 is a processing node that is configured to perform interference mapping as taught herein and to signal the resulting interference mapping information to other nodes, e.g., base stations. In such cases, the additional processing circuits 18 of the node 10 generally do not include cellular radio transceivers.

In the same sense, it will be appreciated that the communication interface circuits 12 are also configured according to the communication link types and protocols for which they are targeted. For example, in a Long Term Evolution (LTE) example, the node 10 is an eNB and the one or more communication interface circuits 12 comprise an X2 interface adapted for signaling to and from other eNBs.

Figure 2:
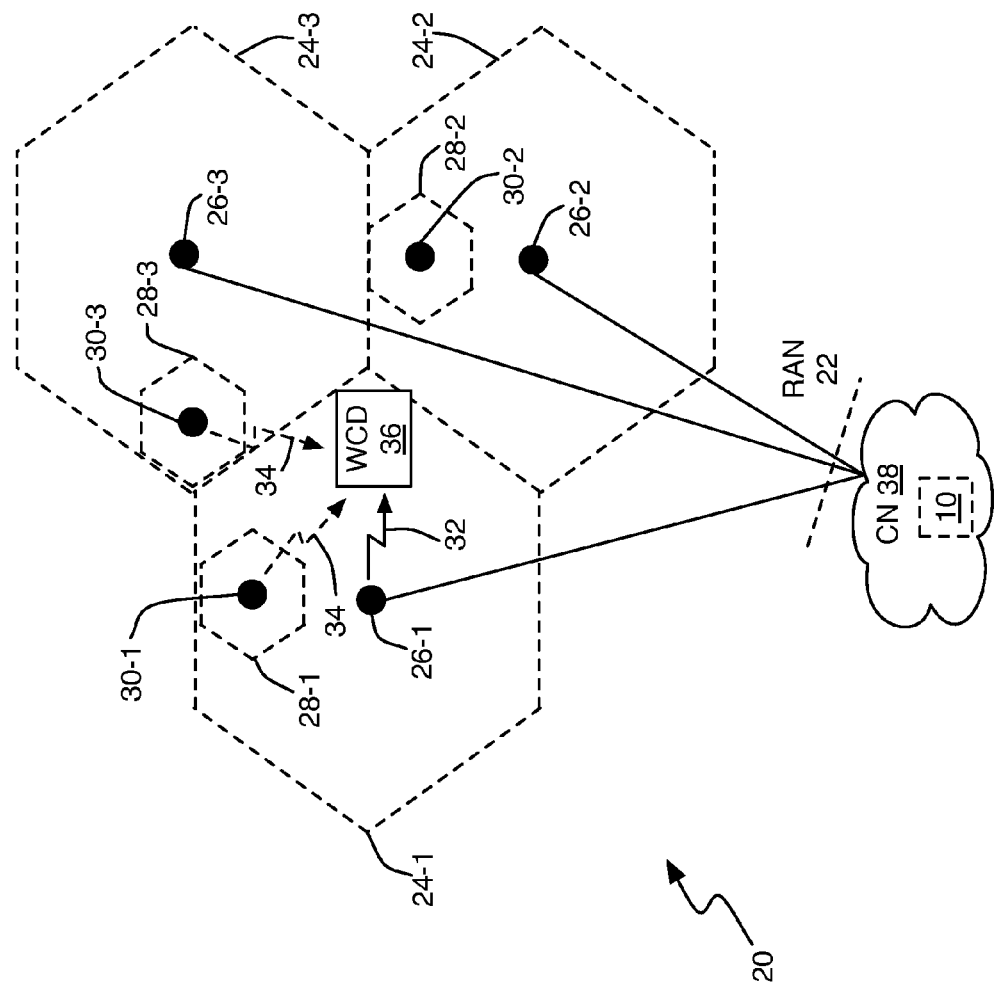
FIG. 2 is a partial block diagram of one embodiment of a wireless communication network that includes, for example, the node introduced in FIG. 1, or additionally or alternatively includes one or more other types of network nodes that are configured to perform interference mapping.

FIG. 2 illustrates an example wireless communication network 20 ("network 20"), which is an LTE network in one example. The illustrated network 20 includes a Radio Access Network (RAN) portion, referred to as RAN 22. The RAN 22 includes a number of macro cells 24 (24-1, 24-2, 24-3), which are served by corresponding macro base stations 26 (26-1, 26-2, 26-3). Each of the illustrated macro cells 24 overlays one or more pico cells 28, where each pico cell 28 is served by an associated pico base station 30. Thus, one sees a pico cell 28-1 supported by a pico base station 30-1. The macro cell 24-1 overlays the pico cell 28-1. Likewise, pico cells 28-2 and 28-3 are shown as being supported by pico base stations 30-2 and 30-3, respectively, and overlaid by the macro cells 24-2 and 24-3, respectively. This example arrangement is non-limiting, and there may be fewer or more macro cells 24, and there may be fewer or more pico cells 28, including multiple pico cells 28 within any given one or more of the macro cells 24.

One sees that the macro base stations 26 transmit downlink (DL) signals 32 and that the pico base stations 30 transmit DL signals 34. It may be assumed that the network 20 uses TDM transmission patterns between or among the various macro cells 24 and/or pico cells 28, as part of its overall Inter-cell Interference Coordination (ICIC) operations. That is, one or more of the macro base stations 26 and/or pico base stations 30 mutes its transmission of DL signals 32 or 34 according to a TDM-based muting pattern. Any node operating in such fashion therefore represents a potential source of time-varying, patterned interference with respect to wireless communication devices 36 that are nearby but connected to another node.

For convenience, the figure illustrates only one wireless communication device 36, abbreviated in the figure as "WCD" for convenience but the network 20 will be understood as supporting a potentially large number of wireless communication devices 20, possibly moving from cell to cell within the overall coverage area of the network 20. In turn, the network 20 includes a Core Network (CN) 38, which includes a number of nodes not shown, such as Serving Gateways, Mobility Management Entities (MMEs), etc.

Figure 3:
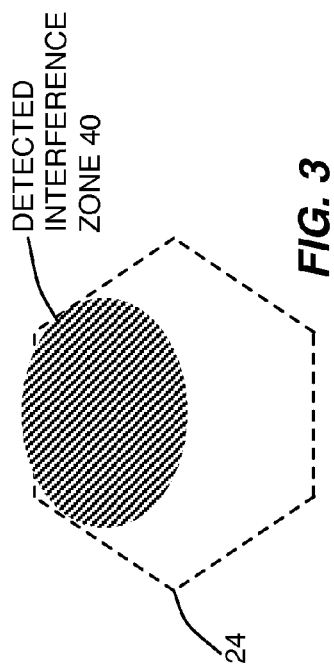
FIG. 3 is a diagram of an example interference mapping, where an identified interference zone is represented as location data corresponding to a location or locations within the coverage area of the wireless communication network.

In at least one embodiment, the network node 10 is implemented in centralized fashion within the CN 38, although in other embodiments it is a RAN-based node, either implemented within one or more of the base stations 26 and/or 30, or as a stand-alone node that is centralized with respect to some or all of the base stations 26 and 30. In any case, the one or more processing circuits 14 of the network node 10 shown in FIG. 1 are configured to identify an interference zone within a coverage area of the network where wireless communication devices 36 are subject to patterned interference arising from interfering TDM transmissions in or around the coverage area. The coverage area may span one or more cells 24 and 28. FIG. 3, for example, shows an interference zone 40 detected within the coverage area of a given cell 24.

In an example case, the one or more processing circuits 14 are configured to identify interference zones 40 within the coverage area(s) represented by the 24 and/or 28, as those are the areas in which wireless communication devices 36 are "meaningfully" affected by patterned interference. For example, the interference mapping circuit 16, which is also referred to herein as an "interference mapping unit," may be configured to deem all or part of the geographic area covered by a given cell 24 or 38 as an interference zone 40, if signal quality measurements made by wireless communication devices 36 in that geographic area are seen over time to frequently exhibit patterned interference in excess of some threshold variance level.

That is, the network 20 collects and evaluates signal measurement reports over time, or data derived therefrom, from wireless communication devices 36 operating within and among the cells 24 and 28 comprising the network 20. By evaluating the signal measurement reports, the network 20 detects instances when given wireless communication devices 20 suffered from patterned interference, where such may be qualified by use of a defined interference variance threshold, so that only instances of patterned interference variance above a defined threshold are considered in the evaluation.

It also may be that at least some wireless communication devices 36 are configured to detect excess levels of patterned interference and send explicit indications of such in the signal measurement reports they send to the network 20 during operation. Thus, interference maps may be learned by evaluating statistically significant sample sets of signal measurement reports and corresponding positioning data, as collected over time from various wireless communication devices 36, for given cells 24 or 28. That evaluation may entail a processing of the actual signal quality measurements to detect patterned interference and/or it may entail tracking the frequency at which various wireless communication devices 36 reported excessive patterned interference.

An interference zone 40 thus identified can be understood as a geographic area within the larger coverage area(s) of the network 20 where a wireless communication device 36 operating within that geographic area will suffer from, or is at least statistically likely to suffer from, the affects of patterned interference.

The interference mapping circuit 16 is thus configured to learn such information and record location data defining the interference zone(s) 40 in an interference map, and to provide the interference map for subsequent use in adapting ICIC operations with respect to a wireless communication device (36) operated within the coverage area. That is, ICIC operations with respect to that particular wireless communication device 36 are adapted based on the location of the wireless communication device 36 relative to an interference zone 40.

In an example case, the one or more processing circuits 14 of the node 10 are configured to adapt ICIC operations with respect to a given wireless communication device 36, as a function of its detected location relative to any known interference zone 40. For example, with respect to a given wireless communication device 36 being detected as in or entering a given interference zone 40, the one or more processing circuits 14 may adjust the scheduling of transmissions to or from the wireless communication device 36, to avoid conflicting with an identified transmission pattern of the interfering TDM transmissions affecting the interference zone 40.

Additionally or alternatively, the one or more processing circuits 14 are configured to communicate with another network node, e.g., a base station 26 or 30, which schedules or otherwise originates the interfering TDM transmissions, to coordinate the interfering TDM transmissions with respect to scheduled transmissions to or from the given wireless communication device 36. It will be appreciated that the particular steps taken by the network node 10 and the signaling involved with those steps, will depend on whether the network node 10 is implemented in a centralized fashion within the CN 38 or the RAN 22, or whether individual macro base stations 26 and/or pico base stations 30 are configured to operate individually as a plurality of such nodes 10, or to operate cooperatively in a distributed version of the node 10.

In some embodiments, the one or more processing circuits 14 are configured to adapt the ICIC operations of one or more base stations 26 and/or 30, based on being configured to adapt a pattern of the interfering TDM transmissions or adapt a scheduling of transmissions to or from a wireless communication device 36 that is detected as being in an interference zone 40, so as to reduce concurrence between the interfering TDM transmissions and scheduled transmissions to or from the wireless communication device 36.

For example, assume that one or more of the base stations 26 and/or 30 are configured to individually perform interference mapping for the coverage area(s) represented by their respective cells 24 and/or 28. Such a base station 26 or 30 may be considered a first node that provides service in a corresponding coverage area in which there is an interference zone 40, and such a node may be configured to adapt the pattern of the interfering TDM transmissions based on sending signaling to a second node that schedules or originates the interfering TDM transmissions.

Of course, the functional "location" of the node 10 will control not only how the ICIC control is performed, e.g., which nodes are involved in adapting ongoing ICIC controls for a given wireless communication device 36, but also controls how the interference zone(s) 40 are mapped and the signaling involved in that process. For example, when the node 10 is centralized with respect to one or more base stations 26 and/or 30, the node 10 may receive data relating to the operation—e.g., data indicating the detection of patterned interference and corresponding geographic location information—of one or more wireless communication devices 36 over time. The node 10 uses this data, e.g., to develop the historical record set from which it identifies interference zone(s) 40 within the coverage area of the network 20.

In other embodiments, where one or more base stations 26 and/or 30 are configured to act as the node 10, there may be no need for signaling signal measurement and corresponding location data to a centralized node. For example, each of one or more base stations 26 or 30 is configured to operate as a node 10, wherein the base station 26 or 30 maintains and analyzes a record of signal quality measurements and corresponding location data, for wireless communication devices 36 operating within the coverage area(s) of the base station 26 or 30. In such embodiments, each base station 26 or 30 may be regarded as developing a localized interference map corresponding to the cell or cells 24 or 28 that it provides. Of course, even in such embodiments, the base stations 26 and/or 30 may share their mapping information with each other, or with another node in the network 20, so that a larger, composite map covering multiple base stations may be formed.

Regardless of these details, in at least some embodiments, the one or more processing circuits 14 of an example node 10 are configured to identify an interference zone 40 within a given coverage area, based on being configured to detect times when given wireless communication devices 36 operating within the coverage area experience excessive variance in received signal interference and record current location data for the given wireless communication devices 36 at such times. Here, "detecting" is based on evaluating the signal measurement reports from the given wireless communication devices 36, for example.

As an example of the above "detecting" operations, the one or more processing circuits 14 are configured to identify the interference zone 40 based at least in part on being configured to process the recorded location data to identify a cluster of geographic locations within the coverage area associated with the excessive variance. That is, the one or more processing circuits 14 are configured to perform a statistical analysis, that identifies interference zones 40 based on correlating incidents of excessive patterned interference with corresponding geographic information, to detect geographically-clustered incidents. The processing circuit(s) 14 also may be configured to use certain numeric thresholds, e.g., maximum distance values to determine whether given incidents belong to a given cluster and/or incident count or density thresholds that dictate how many incidents of excessive patterned interference within a given sub-region will be considered as indicative of that sub-region being an interference zone 40.

After or as part of identifying an interference zone 40 for a given coverage area, the processing circuits 14 in some embodiments are further configured to identify a transmission pattern for the interfering TDM transmissions. Additionally, or alternatively, the processing circuits 14 are configured to identify the network node (e.g., the responsible base station 26, 30) that schedules or otherwise originates the interfering TDM transmissions. Further, the processing circuits 14 are configured to record the identified transmission pattern or the identified network node as part of the data comprising the interference map.

Such data directly facilitates usage of the interference map in adapting ICIC operations with respect to wireless communication devices 36 that are detected as in or entering an identified interference zone 40. It should be understood here that interference map may be developed over a given time period and subsequently used at a later time or times, to improve ICIC operations at least within the coverage areas represented in the interference map. Thus, the wireless communication devices 36 whose signal quality measurement reports were used in generating the interference map generally will not be the same ones as for which the interference map is later used in adapting ICIC operations.

However, it is contemplated herein to continue refining or otherwise updating the interference map during ongoing operations of the network 20, and in such example embodiments, it may be that signal quality measurement reports from a given wireless communication device 36 are used to update the interference map, while also using the interference map to determine whether ICIC operations should be adapted with respect to the same wireless communication device 36, e.g., in response to detecting that it is moving into or out of an identified interference zone 40.

Thus, in some embodiments, the processing circuits 14 of an example node 10 are configured to perform the interference mapping process on a continuing basis, so that the location data defining an interference zone 40 in an interference map is updated, as needed, in dependence on new signal measurement reports, or so that one or more additional interference zones 40 are detected dynamically as new patterned interference sources are detected from new signal measurement reports. Such operation is particularly helpful in adapting the interference map to newly introduced sources of patterned interference, such as when home base stations are activated.

In at least one such embodiment, a given interference map includes initialization data comprising location data defining one or more previously identified interference zones 40 within a given coverage area. This allows the base station or stations 26 or 30 that provide service in the coverage area to "begin" with an earlier-developed interference map, and yet allows newly identified interference zones 40 to be added to the interference map, as new zones are detected and identified over time.

As was noted, the basic processing of identifying interference zones 40 involves evaluating signal quality measurement reports from wireless communication devices 36 operating over time within a given coverage area. The number of wireless communication devices 36 represented in a collected data set may be quite large, and the collected data may span days, weeks, or months of operational data, for example. Regardless, the signal measurement reports from any given wireless communication device 36 may include implicit or explicit indications of interference variance during its operation within the given coverage area.

As one example, an implicit indication is provided by the wireless communication device 36 sending CQI or other signal quality measurement reports at a rate sufficiently fast—e.g., 1 kHz—for the network 20 to discern patterned interference from variations in the reported signal quality. Conversely, with explicit signaling, a wireless communication device 36 is configured to monitor variance in interference levels observed at its receiver, and to report, for example, when that variance exceeds a defined threshold. Such wireless communication devices 36 also may be configured to report the associated pattern of interference, or they may rely on the network 20 to discern the pattern.

Broadly, the teachings herein contemplate a network node 10 that includes processing circuits 14 which are configured to identify an interference zone 40 within a given coverage area of a network 20, based on being configured to determine that there is a cluster of geographic positions associated with signal measurement reports indicating an excessive variance in received signal interference levels. These signal measurement reports are collected, for example, from a dynamically changing set of reporting wireless communication devices 36 over a time period sufficient to develop a statistically significant "picture" of interference conditions within the coverage area.

Correspondingly, the one or more processing circuits 14 are configured to identify an interference zone 40 and record the location data for the interference zone 40 as part of an interference mapping process performed by the node 10. There may be one such node 10 responsible for mapping interference zones 40 over a broad coverage area that spans the coverage of multiple base stations 26 and/or 30. Alternatively, there may be multiple instances of the node 10, each responsible for mapping over a portion of the overall coverage area. In an example of this configuration, each of one or more base stations 26 or 30 is configured to operate, as an instance of the node 10, to perform interference mapping at least for the portion of the coverage area that is associated with each such base station 26 or 30.

Figure 4:
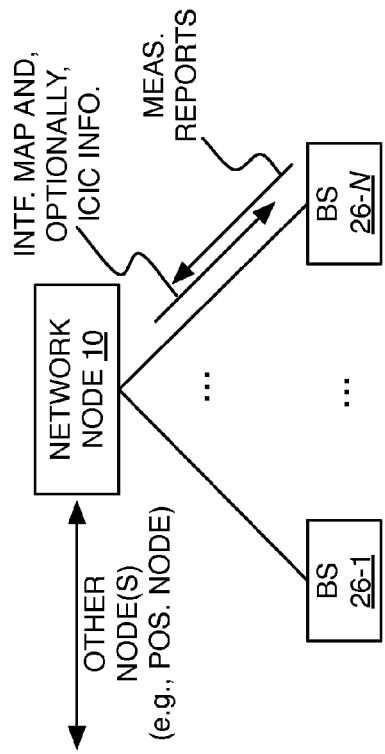
FIG. 4 is a block diagram illustrating an example embodiment of network nodes where interference mapping is performed at least in part in a centralized fashion.
Figure 5:
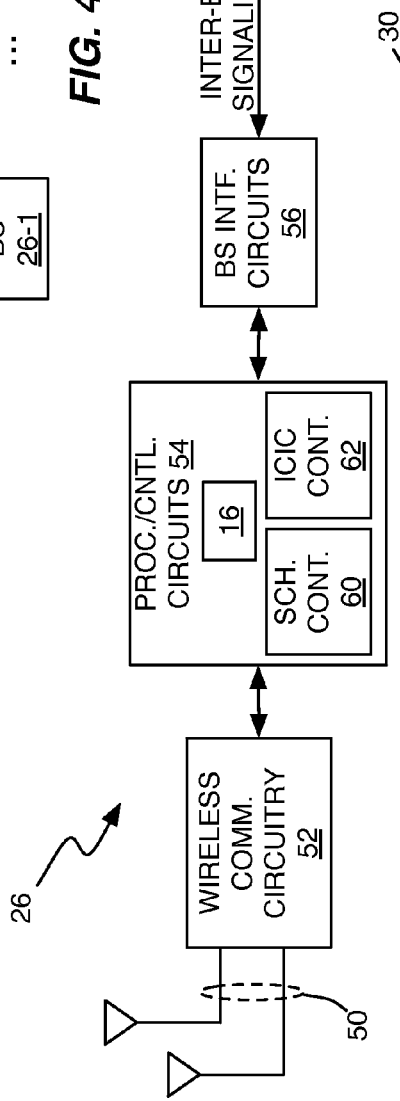
FIG. 5 is a block diagram illustrating an example embodiment of network nodes where interference mapping is performed in a distributed fashion, e.g., on a per base station basis.
Figure 5:
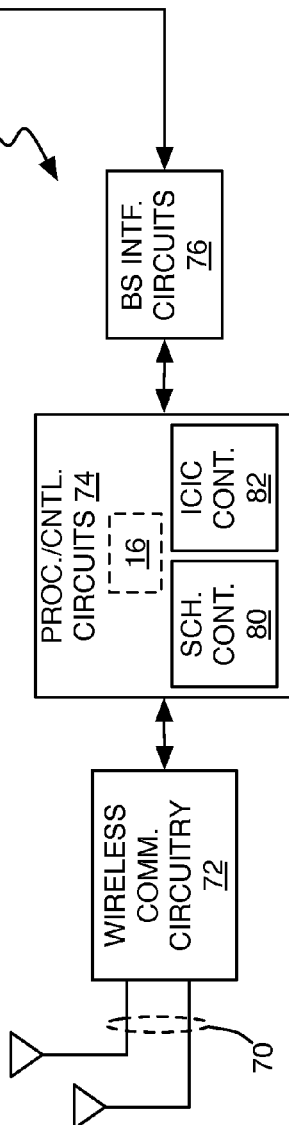

FIG. 4 illustrates an example case, where the node 10 is configured as a centralized node with respect to one or more base stations 26-1 through 26-N (and/or one or more base stations 30). Alternatively, FIG. 5 illustrates the case where a base station 26 is configured to operate as an instance of the node 10, e.g., where it identifies interference zones 40 within its coverage area, and communicates with one or more other base stations 26 or 30.

The base station 26 includes one or more receive/transmit antennas 50 and associated wireless communication circuitry 52 (e.g., cellular radio transceiver circuitry), along with communication processing and control circuits 54, which are broadly referred to as "one or more processing circuits" 54. In an example case, the one or more processing circuits 54 include an instance of the interference mapping circuit 16 described earlier, in keeping with the base station 26 serving as an instance of the network node 10.

The base station 26 may further include inter-base station interface circuits 56, for communicating with other base stations 26 or 30, a scheduling controller 60 and an ICIC controller 62, where "controller" is used to denote a processing circuit configured to carry out certain processing. Here, the scheduling controller 60 comprises one or more processing circuits that are configured to scheduled uplink and/or downlink resources for a plurality of wireless communication devices 36 operating within the coverage area of the base station 26. Similarly, the ICIC controller 62 comprises one or more processing circuits configured to carry out one or more operations associated with ICIC, e.g., interacting with the scheduling controller 60, to adapt the scheduling of one or more wireless communication devices 36 responsive to coordination information from one or more other cells 24 or 28 in the network 20.

In an example case, the base station 26 develops an interference map for its coverage area, including the identification of any interference zones 40 within that map, and then uses the map to adapt ICIC operations, such as by communicating with a base station 30 having a smaller coverage area that is overlaid by or proximate to the coverage area of the base station 26. That is, the base station 30 is an interfering node in an example case, responsible for originating interfering transmissions within all or a portion of the coverage area of the base station 26, and the base station 26 can thus coordinate with the base station 30 so that scheduling at one or both of them is adapted to reduce instances of uplink and/or downlink interference between them.

The base station 30 may or may not be configured the same or similar to the base station 26. In the example illustration, it includes on or more transmit/receive antennas 70 and associated wireless communication circuitry 72—e.g., cellular radio transceivers. The base station 30 further includes one or more communication and control processing circuits 74, which may include an instance of the interference mapping circuit 16, in cases where the base station 30 is intended to operate as an instance of the node 10. Further, the base station 30 includes, e.g., a scheduling controller 80 and an ICIC controller 82, which may communicate with corresponding entities in the base station 26 via the included inter-base-station interface circuits 76.

Figures 6, 7:
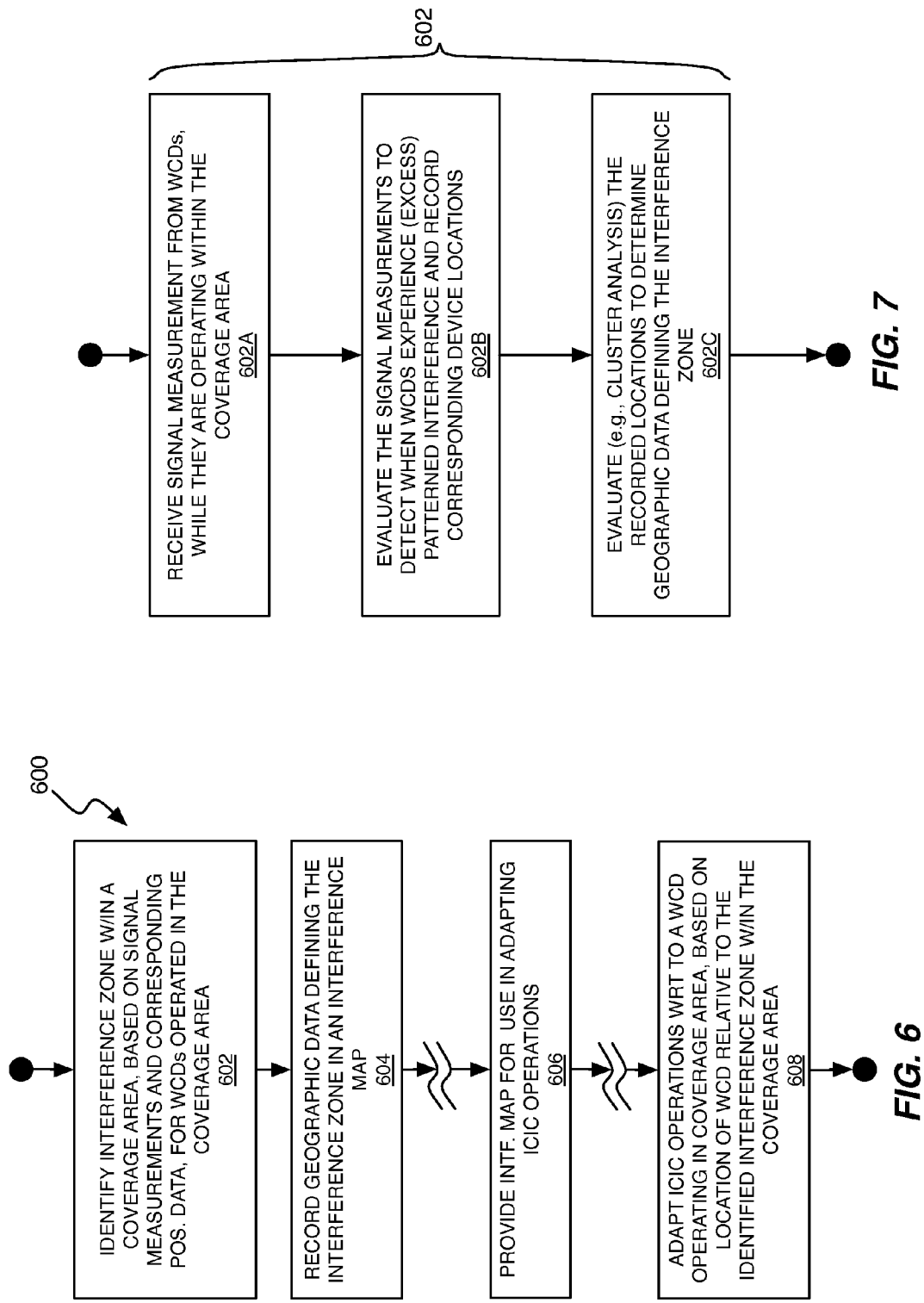
FIG. 6 is a logic flow diagram of one embodiment of a method of interference mapping.
FIG. 7 is a logic flow diagram of one embodiment of the interference zone identification step illustrated in FIG. 6.

Whether implemented in a centralized version of the node 10, or integrated into the broader functionality of a base station 26 or 30, FIGS. 6 and 7 illustrate example processing methods for generating and using an interference map. In this regard, FIG. 7 can be understood as providing further example details for one of the processing operations depicted in FIG. 6, and both illustrations should be understood as depicting the operations of processing circuits configured according to fixed hardware, programmable circuitry, or some combination thereof. Moreover, one or more of the steps illustrated may be performed in a different order or in parallel, and some or all of the depicted processing may be performed as part of a larger set of processing tasks, e.g., as part of ongoing node operations, and may be duplicated at least in part with respect to adapting ICIC operations with respect to different WCDs 36.

With the above in mind, the method 600 provides for ICIC control in a wireless communication network 20 that is configured to provide communication service to wireless communication devices 36. In the illustrated example, the method 600 includes identifying (Block 602) an interference zone 40 within a coverage area—e.g., one or more cells 24 and/or 28 of the network 20—where wireless communication devices 36 are subject to patterned interference arising from interfering TDM transmissions in or around the coverage area. "Identifying" in this context is based on signal measurement reports and corresponding positioning data obtained for given wireless communication devices 36 during operation within the coverage area.

The method 600 further includes recording (Block 604) location data defining the interference zone (40) in an interference map. The interference map may represent any appropriate information indicating a location of all or a portion of the interference zone. For example, in particular embodiments, the interference map may be a data structure including values representing the geographic boundaries, for example, of the identified interference zone 40. Correspondingly, the method 600 includes providing (Block 606) the interference map for use in adapting ICIC operations with respect to a wireless communication device 36 operated in the (same) coverage area, based on the location of the wireless communication device 36 relative to the interference zone 40.

It will be understood that the wireless communication device 36 for which ICIC operations are adapted as a function of its location relative to the interference zone 40 may or may not be one of the wireless communication devices 36 for which signal measurement reports were used in generating the interference map. Indeed, as the line breaks shown in the processing flow of FIG. 6 between blocks 604, 606, and 608 suggest, the interference map may be developed over a first time frame, and retained in memory or other computer-readable medium for later use with whatever wireless communication devices 36 happen to be operating within the coverage area at such later time(s).

FIG. 7 provides further example details for Block 602 in FIG. 6, which relates to the identification of the interference zone 40. One sees that Block 602 comprises a number of operations 602A-602C, including receiving signal measurements from given wireless communication devices 36 while they are operating within the coverage area at issue in the interference mapping process (Block 602A). These signal measurements are provided, e.g., in periodically transmitted CQI or other signal quality reports from the wireless communication devices 36.

Processing continues with evaluating the signal measurement data to detect instances when the (reporting) wireless communication devices 36 experience excessive patterned interference (Block 602B). Here, a threshold, e.g., in dB or dBm, may be used to define a level of patterned interference variance that is considered as significant. By recording the geographic locations associated with significant levels of patterned interference within the coverage area of interest, an interference zone 40 is identified within the coverage area by evaluating, e.g., via cluster analysis, the recorded location information, to determine the location data defining the interference zone 40 (Block 602C).

For example, during the mapping process, if the network 20 or a wireless communication device 36 detects that the device is experiencing excessive levels of patterned interference variance, the network 20 requests that the device 36 report a Received Signal Received Power (RSRP) measurement to its serving and nearest-neighbor base stations 26 and/or 30. The involved base stations 26 and/or 30 also may request that the device 36 report its position/location, e.g., in accordance with 3GPP RRC 36.331.

By combining information on the detected TDM pattern and device location information—as extracted by RSRP values, or angle of arrival values, or explicit location-information—one or more of the involved base stations 26 and/or 30 can, over time, generate an interference map, including one or more identified interference zones. Such operation is useful in a variety of network deployments, such as where relay nodes are deployed, where the relay nodes may use the same or different Un-Uu interface configurations, i.e., they may have the same or different TDM transmission patterns.

In such a scenario, patterned interference having excessive variance may be detected from the signal measurements from given wireless communication devices 36 operating within coverage areas nearby the relay zone coverage areas, and such areas thus may be recorded as interference zones 40 in the previously described interference mapping process. The interference map could then be used by the base station(s) 26 or 30 that serve the affected coverage area, such that as some later time ICIC operations within or adjacent the affected area are adapted for given wireless communication devices 36 that are detected as entering, in, or leaving any of the identified interference zones 40. For example, there may be defined scheduling policies that are triggered for any wireless communication device 36 that is detected as entering or being within one of the interference zones 40.

As noted previously, the interference mapping process may be a one-time event, conducted over some period of time sufficient for collecting enough data for reliable identification of any interference zones 40, or the mapping process may be an ongoing learning process. For example, an initial interference map is dynamically updated in response to monitoring or tracking signal measurements on an ongoing basis, to detect when new sources of patterned interference have been introduced. Such operation particularly complements Self-Organizing-Network (SON) scenarios, where new relay nodes and/or low-power base stations may be introduced on an as-needed basis.

More broadly, it is taught herein that a wireless communication network develops statistics related to reported/detected TDM transmission patterns. These statistics indicate the TDM transmission patterns detected from neighbor network nodes together with the "radio position" of the affected user equipments (UEs) or other wireless communication devices. "Radio position" as used here involves RSRP and/or Received Signal Received Quality (RSRQ) from serving and closest neighbor network nodes, as well as angle of arrival to the serving network node. Furthermore, geographical positioning (GPS) information can be used. The network then forms a "map" of geographical areas where devices are likely to be affected by the TDM transmission pattern of one or more neighbor network nodes. The serving base station responsible for a coverage area having one or more interference zones 40 within it applies ICIC algorithms when scheduling devices situated in any of the interference zones 40, where the ICIC algorithms take into consideration the particular TDM transmission patterns affecting the interference zones 40.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of inter-cell interference coordination (ICIC) control in a wireless communication network that is configured to provide communication service to wireless communication devices, said method comprising:

identifying, within a coverage area of the network, an interference zone in which wireless communication devices are subject to patterned interference arising from interfering transmissions from nodes that mute their transmissions according to a particular schedule, said identifying based on signal measurement reports and corresponding positioning data obtained for the wireless communication devices during operation within the coverage area;

recording location data defining the interference zone in an interference map; and providing the interference map for use in adapting ICIC operations with respect to a wireless communication device operating in the coverage area, based on a location of the wireless communication device relative to the interference zone.

2. The method of claim 1, wherein said method includes adapting the ICIC operations with respect to the wireless communication device, as a function of a detected location of the wireless communication device relative to the interference zone.

3. The method of claim 2, wherein said step of adapting the ICIC operations comprises performing at least one of: adjusting the scheduling of transmissions to or from the wireless communication device to avoid conflicting with an identified transmission pattern of the interfering transmissions; and communicating with a network node identified as scheduling or originating the patterned interference, to coordinate the interfering transmissions with respect to scheduled transmissions to or from the wireless communication device.

4. The method of claim 2, wherein said step of adapting the ICIC operations comprises adapting a pattern of the interfering transmissions or adapting a scheduling of transmissions to or from the wireless communication device, so as to reduce concurrence between the interfering transmissions and scheduled transmissions to or from the wireless communication device.

5. The method of claim 4, wherein adapting the pattern of interfering transmissions comprises sending signaling from a first node providing service in the coverage area, to a neighboring, second node that schedules or originates the interfering transmissions.

6. The method of claim 1, wherein said step of identifying the interference zone comprises detecting times when the wireless communication devices operating within the coverage area experience excessive variance in received signal interference and recording current location data for the wireless communication devices at such times, said detecting based on evaluating the signal measurement reports from the wireless communication devices.

7. The method of claim 6, wherein said step of identifying the interference zone includes processing the recorded location data to identify a cluster of geographic locations within the coverage area associated with said excessive variance.

8. The method of claim 1, further comprising identifying a transmission pattern for the interfering transmissions, or identifying a network node that schedules or otherwise originates the patterned interference, and recording the identified transmission pattern or the identified network node as part of the data comprising the interference map.

9. The method of claim 1, wherein the signal measurement reports include implicit or explicit indications of interference variance from the wireless communication devices during operation in the coverage area, and wherein said step of identifying the interference zone includes determining that there is a cluster of geographic positions associated with signal measurement reports indicating an excessive variance in received signal interference levels.

10. The method of claim 1, wherein said step of identifying the interference zone and recording the location data for the interference zone comprises part of an interference mapping process performed by one or more nodes in the network.

11. The method of claim 10, further comprising:
updating location data defining the interference zone in the interference map in dependence on new signal measurement reports; or
detecting one or more additional interference zones as new patterned interference sources are detected from new signal measurement reports.

12. The method of claim 1, wherein the interference map includes initialization data comprising location data defining a previously known interference zone within the coverage area, and wherein the identified interference zone is dynamically learned and added to the interference map.

13. A network node for use in a wireless communication network that is configured to provide communication service to wireless communication devices, said network node comprising one or more processing circuits configured to:
identify, within a coverage area of the network, an interference zone in which wireless communication devices are subject to patterned interference arising from interfering transmissions from nodes that mute their transmissions according to a particular schedule, said identifying based on signal measurement reports and corresponding positioning data obtained for the wireless communication devices during operation within the coverage area;
record location data defining the interference zone in an interference map; and
provide the interference map for use in adapting ICIC operations with respect to a wireless communication device operating in the coverage area, based on the location of the wireless communication device relative to the interference zone.

14. The network node of claim 13, wherein the one or more processing circuits are configured to adapt the ICIC operations with respect to the wireless communication device, as a function of a detected location of the wireless communication device relative to the interference zone.

15. The network node of claim 14, wherein the one or more processing circuits are configured to adapt the ICIC operations based on being configured to perform at least one of: adjusting the scheduling of transmissions to or from the wireless communication device to avoid conflicting with an identified transmission pattern of the interfering transmissions; and communicating with a network node identified as scheduling or originating the patterned interference, to coordinate the interfering transmissions with respect to scheduled transmissions to or from the wireless communication device.

16. The network node of claim 14, wherein the one or more processing circuits are configured to adapt the ICIC operations based on being configured to adapt a pattern of the interfering transmissions or adapt a scheduling of transmissions to or from the wireless communication device, so as to reduce concurrence between the interfering transmissions and scheduled transmissions to or from the wireless communication device.

17. The network node of claim 16, wherein the one or more processing circuits are configured to adapt the pattern of interfering transmissions based on being configured to send signaling from a first node providing service in the coverage area, to a neighboring, second node that schedules or originates the interfering transmissions.

18. The network node of claim 13, wherein the one or more processing circuits are configured to identify the interference zone based on being configured to detect times when the wireless communication devices operating within the coverage area experience excessive variance in received signal interference and record current location data for the wireless communication devices at such times, said detecting based on evaluating the signal measurement reports from the wireless communication devices.

19. The network node of claim 18, wherein the one or more processing circuits are configured to identify the interference zone based at least in part on being configured to process the recorded location data to identify a cluster of geographic locations within the coverage area associated with said excessive variance.

20. The network node of claim 13, wherein the one or more processing circuits are further configured to identify a transmission pattern for the interfering transmissions, or identify a network node that schedules or otherwise originates the patterned interference, and record the identified transmission pattern or the identified network node as part of the data comprising the interference map.

21. The network node of claim 13, wherein the signal measurement reports include implicit or explicit indications of interference variance from wireless communication devices during operation in the coverage area, and wherein the one or more processing circuits are configured to identify the interference zone based on being configured to determine that there is a cluster of geographic positions associated with signal measurement reports indicating an excessive variance in received signal interference levels.

22. The network node of claim 13, wherein the one or more processing circuits are configured to identify the interference zone and record the location data for the interference zone as part of an interference mapping process performed by one or more network nodes in the network.

23. The network node of claim 22, wherein the one or more processing circuits are configured to:
update location data defining the interference zone in the interference map in dependence on new signal measurement reports; or
detect one or more additional interference zones as new patterned interference sources are detected from new signal measurement reports.

24. The network node of claim 13, wherein the interference map includes initialization data comprising location data defining a previously known interference zone within the coverage area, and wherein the identified interference zone is dynamically learned and added to the interference map.

* * * * *

UNITED STATES PATENT AND TRADEMARK OFFICE
CERTIFICATE OF CORRECTION

PATENT NO. : 9,232,405 B2  
APPLICATION NO. : 13/561838  
DATED : January 5, 2016  
INVENTOR(S) : Dimou et al.

Page 1 of 1

It is certified that error appears in the above-identified patent and that said Letters Patent is hereby corrected as shown below:

Specification

In Column 5, Line 31, delete "devices 20," and insert -- devices 36, --, therefor.

In Column 5, Line 58, delete "cell 24 or 38" and insert -- cell 24 or 28 --, therefor.

In Column 6, Line 2, delete "devices 20" and insert -- devices 36 --, therefor.

In Column 10, Line 22, delete "on or" and insert -- one or --, therefor.

Signed and Sealed this  
Twelfth Day of April, 2016

Michelle K. Lee  
*Director of the United States Patent and Trademark Office*